_United States Patent Office_

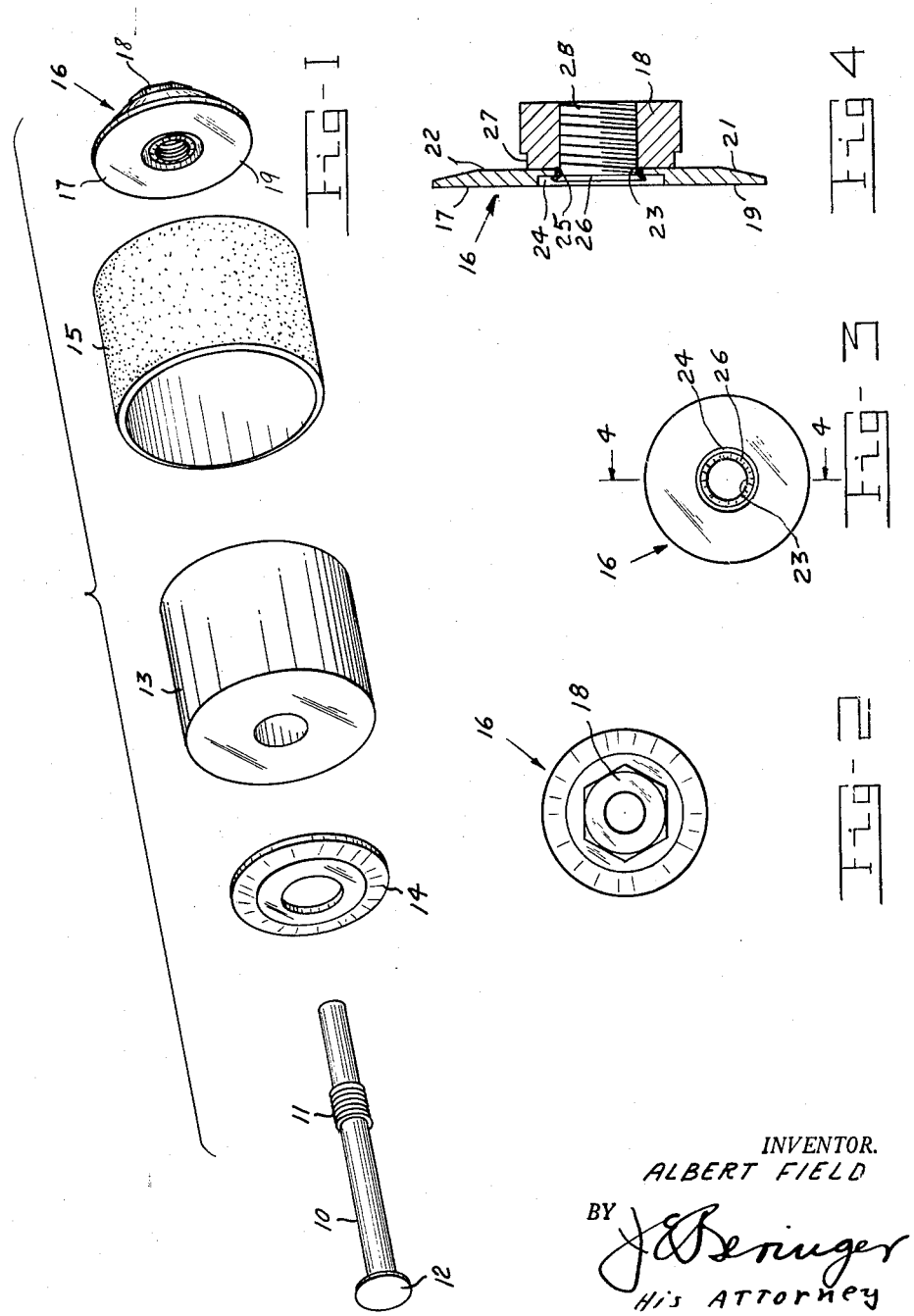

2,734,321
Patented Feb. 14, 1956

2,734,321

ABRADING IMPLEMENT

Albert Field, Dayton, Ohio

Application May 10, 1955, Serial No. 507,396

6 Claims. (Cl. 51—190)

This invention relates to abrading implements, and particularly to so-called drum sanders wherein a cylindrical band made of abrasive coated fabric is installed on a rotary mandrel for internal sanding and finishing operations.

The abrasive bands need frequently to be replaced, and it is a principal object of the invention in this connection materially to simplify and to speed up the work of removing a worn band and replacing it with a new one. More particularly it is an object of the invention to obviate the use of tools in such replacement as well as the need for assembly and disassembly of multiple parts.

According to a feature of the invention, a generally new floating unit comprising a pressure plate and a nut is introduced which can readily be tightened and loosened in the drum assembly, using only the finger, and which represents the sole adjustment in the removing and replacing of an abrasive band.

Other objects and structural details of the invention will appear from the following description when read in connection with the accompanying drawing wherein:

Fig. 1 is a view in exploded perspective showing the parts of a drum sander constructed in accordance with the illustrative embodiment of the invention;

Fig. 2 is a view of the floating pressure plate and nut assembly in one end elevation;

Fig. 3 is a view of the assembly of Fig. 2 in opposite end elevation; and

Fig. 4 is a view in cross section, taken substantially along the line 4—4 of Fig. 3.

Referring to the drawing, according to the illustrative embodiment of the invention, a sanding drum assembly comprises a mandrel 10 which intermediate its ends has a screw threaded portion 11. On one end of the mandrel 10 is an integrally formed head 12, the other end being adapted to be received in the chuck of a power tool or the like for positive rotation of the mandrel. Slipped over the mandrel 10 to lie substantially between the threaded portion 11 and the head 12 is a sleeve 13 made of a relatively soft deformable rubber or rubber-like material. The ends of the sleeve 13 are sharply cut off in planes at right angles to the longitudinal axis of the sleeve. A reactant disc 14 is installed on the mandrel 10 between the head 12 thereof and the adjacent end of the sleeve 13.

Supported on and surrounding the sleeve 13 is a fabric band 15 externally coated with an abrasive material. In the unpressurized condition of the sleeve 13 the band 15 fits relatively loosely thereon and may be slid axially on and off the sleeve at will. In following relation to the sleeve 13 on the mandrel 10 is a pressure plate and nut assembly 16 comprising a plate 17 and a nut 18. The former has the shape of a disc approximately equal to or slightly less in diameter than the sleeve 13 and presenting on one side thereof a smooth planar surface 19. On its opposite side the plate 17 is formed with an inwardly tapering surface 21 terminating in a planar wall 22 for abutment by the nut 18. In the center of the plate 17 is an opening 23 and there is still further formed therein a counterbore 24 opening through the surface 19.

The nut 18 is generally conventional in shape except for a cylindrical axial projection 25 thereon which passes through the opening 23 in the plate 17 and terminates in a flange 26 turned out into the counterbore 24. Also, the nut 18 is formed with a concentric shoulder 27 for abutment with the shoulder or surface 22 on the plate 17. The interior of the nut 18 and of its axially projecting portion 25 is formed with a continuous screw thread 28 complementary to the threaded portion 11 of mandrel 10.

The projection 25 on the nut 18 is made slightly less in diameter than is the opening 23. Also, the spacing between the flange 26 on the projection 25 and the shoulder 27 on the nut 18 somewhat exceeds the thickness of the plate 17 from the bottom of the counterbore 24 to the plane of abutment surface 22. As a result, a wobble connection is defined between the pressure plate 17 and the nut 18, permitting slight relative longitudinal and tilting motions therebetween. It may be noted, however, that the relative axial motions permitted the pressure plate and nut are insufficient to project the flange 26 relatively to the surface 19 of the pressure plate. A flat smooth surface thus is assured at what may be considered to be the inner end of the plate and nut assembly.

As noted above, the assembly 16 is mounted on the mandrel 10 in following relation to the sleeve 13 and is moved axially over the mandrel until the screw threaded portion 11 is encountered whereupon continued forward advance of the assembly upon the sleeve 13 is accomplished by rotary motion of the nut 18. In the course of such motion, the surface 19 of the plate 17 contacts the end of the sleeve 13. Still further axial movement of the plate and nut assembly, effected by continued rotation of the nut 18, serves to squeeze the sleeve 13 between the disc 14 and the pressure plate 17 with the result that the sleeve is expanded outward into firm contact with the internal surface of the band 15 and it will be understood that a tight frictional connection between the sleeve and band 15 may in this manner be achieved. To loosen the assembly, for removal of a band 15, the nut 18 is turned in the opposite direction or in a direction to back it axially off the threaded portion 11 thereby releasing the pressure applied to the sleeve 13 which is free to assume its normal shape and so in turn release the band 15. It will be apparent that the construction of the floating plate and nut assembly is such as materially to reduce traction in the applying and reducing of pressure on the sleeve 13 which, as may be seen, tends to resist axial advance of the plate 17 during a band tightening operation and which applies through the plate 17 a resistance to loosening of the nut 18 after the pressure plate and nut assembly has been screwed up to band locking position. The reduction of these forces of opposition afforded by the instant structure permits the assembly adequately to be tightened and to be loosened using the fingers alone whereas in the past it has been necessary to keep on hand and make use of a wrench for this purpose. Also, the unitary character of the pressure plate and nut obviates the handling of multiple parts in the assembly and disassembly of the sander structure. In this regard, it will be understood that a single mandrel 10 may be used in conjunction with sleeves 13 of different diameter, these being substituted thereon in accordance with the dimensions of the surface to be finished.

What is claimed is:

1. An abrading implement, including a mandrel having a head on one end and a threaded portion intermediate its ends, a disc on said mandrel abutting said head and relatively larger in diameter than said head, a sleeve made of a material radially expansible under axial compression mounted on said mandrel between said disc and said screw threaded portion, one end of said sleeve abutting said disc, a nut received on said mandrel in threaded relation to said threaded portion, a cylindrical concentric projection on said nut extending toward the other end of said sleeve, and a disc relatively rotatably mounted on said projection abutting said sleeve, said last named disc being approximately equal in diameter to the first said disc, means for limiting axial motion of said nut relatively to said last named disc, and an abrasive coated band on said sleeve tightened and loosened thereon by axial adjustment of said nut on said mandrel.

2. An abrading implement, including a mandrel, means defining an enlarged head on one end of said mandrel, there being a screw threaded portion on said mandrel toward the other end thereof, a sleeve made of a resilient deformable material on said mandrel, one end thereof abutting said enlarged head, a disc in surrounding spaced relation to said mandrel at the other end of said sleeve, said disc having on one side thereof a planar surface for abutting said sleeve in opposed relation to said head means, and further having an axial through bore and a counterbore opening through said planar surface, a nut on said mandrel in threaded relation to the screw threaded portion of said mandrel and located between said disc and the said other end of said mandrel, a concentric cylindrical projection on said nut extending into the said through bore in said disc, said disc being rotatably mounted on said projection and the terminal edge of said projection being turned over into said counterbore to limit relative axial motion of said nut and said disc, and an abrasive coated band on said sleeve tightened and loosened thereon by axial adjustment of said nut on said mandrel toward and from the other side of said disc.

3. An abrading implement according to claim 2, characterized by an annular shoulder on said nut engageable with the said other side of said disc, said shoulder and the said turned over end of said cylindrical projection being spaced apart to limit relative axial motion of said nut and said disc to a distance less than that required to project said turned over end through the planar surface of said disc.

4. An abrading implement according to claim 2, characterized in that said disc has a relatively loose fit on said cylindrical projection providing for limited relative tilting motions of said nut and disc.

5. An abrading implement of the kind having a mandrel and a resilient deformable sleeve thereon axially compressed and released to tighten and to loosen an abrasive band thereon; characterized by a pressure disc and nut assembly, said nut having a threading mounting on said mandrel and rotatably supporting said pressure disc, said nut and disc being interconnected for limited relative axial and tilting motions.

6. A pressure disc and nut assembly for use in drum sanding and like devices, including a disc having a flat planar surface on one side and an axial through bore, said disc further having a counterbore opening through said planar surface, a nut along side said disc on the opposite side thereof, said nut having on its adjacent side a concentric projecting portion entering the through bore in said disc and having its outer end turned over into said counterbore, said turned over end limiting relative axial motion of said nut and disc in one direction, and an annular shoulder on said adjacent side of said nut engageable with the said opposite side of said disc to limit relative axial motion of said nut and disc in the opposite direction, said shoulder and said turned over end being spaced apart a distance limiting relative axial motion in the last mentioned direction to a distance less than that required to project said turned over end through said planar surface but enough to permit relative tilting motion of said nut and said disc, said concentric projection being made slightly smaller in diameter than said through bore to permit of such tilting motion.

References Cited in the file of this patent

UNITED STATES PATENTS

| | | |
|---|---|---|
| 238,284 | Hapgood | Mar. 1, 1881 |
| 382,041 | Keavy | May 1, 1888 |
| 574,763 | Rudolph | Jan. 5, 1897 |
| 1,208,501 | Crocker | Dec. 12, 1916 |
| 1,839,139 | Brockman | Dec. 29, 1931 |
| 1,913,261 | Brockman | June 6, 1933 |
| 1,953,181 | Lintereur | Apr. 3, 1934 |